United States Patent Office 3,036,105
Patented May 22, 1962

3,036,105
UNSYMMETRICALLY-SUBSTITUTED SILOXANYLFERROCENES
Robert L. Schaaf, Wyandotte, Mich., assignor to Wyandotte Chemicals Corporation, Wyandotte, Mich., a corporation of Michigan
No Drawing. Filed Aug. 24, 1960, Ser. No. 51,543
8 Claims. (Cl. 260—439)

This invention relates to a new class of compositions of matter, unsymmetrically-substituted siloxanylferrocenes.

Silanylferrocenes are known compounds that have been prepared and evaluated for use as functional liquids. Such compounds have been produced with long alkyl radicals as part of the molecule in an effort to obtain products having high boiling points. Such long alkyl groups give rise to a problem of thermal stability since they tend to cleave when the silanylferrocenes are maintained at high temperatures for extended periods of time. An

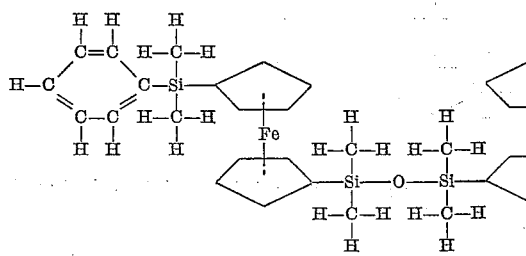

object of this invention is, therefore, to produce functional liquids which remain liquids throughout a wide temperature range.

Another object is to produce functional liquids that are highly resistant to thermal degradation.

I have discovered that these objectives are attained in a class of unsymmetrically-substituted siloxanylferrocenes which possesses good dielectrical properties, as well. The compounds of the invention are useful as base-stocks for high-temperature hydraulic fluids and lubricants. In the formulae for the compounds of the invention, the representation of the ferrocenyl radical by the symbols,

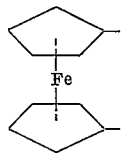

will be understood to stand for the structure where one atom of iron is bound to two cyclopentadienyl rings. The class of unsymmetrically-substituted siloxanylferro-

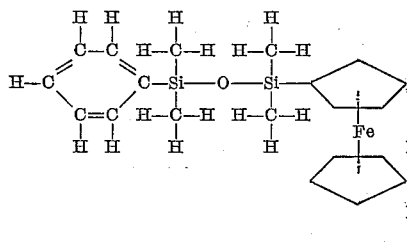

cenes of this invention consists of the following compounds:

A. Tris[(1' - phenyldimethylsilylferrocenyl)dimethylsiloxy]-methylsilane having the structure,

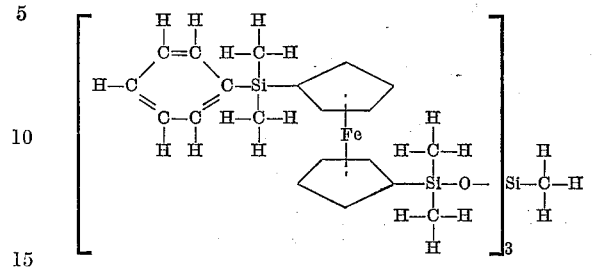

B. 1,1' - bis[3 - (1' - phenyldimethylsilylferrocenyl)-1,1,3,3-tetramethyldisiloxanyl]-ferrocene having the structure,

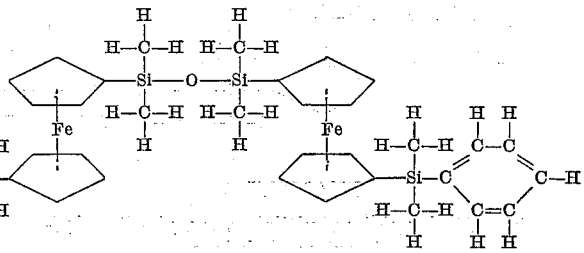

C. 1 - trimethylsilyl -1' - (3-phenyl-1,1,3,3-tetramethyldisiloxanyl)-ferrocene having the structure,

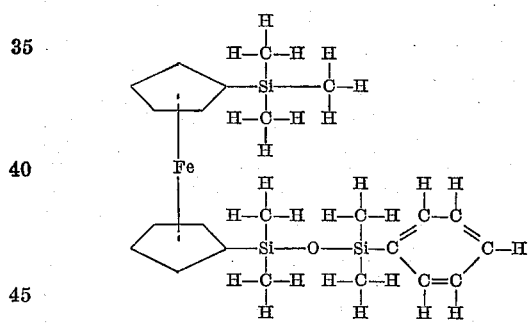

D. 1,5 - bis(1' - trimethylsilylferrocenyl) - 1,1,3,3,5,5-hexamethyltrisiloxane having the structure,

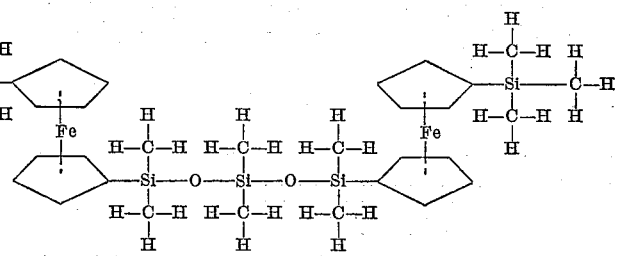

E. 1,3 - bis[1'-(3 - phenyltetramethyldisiloxanyl) - ferrocenyl]-tetramethyldisiloxane having the structure,

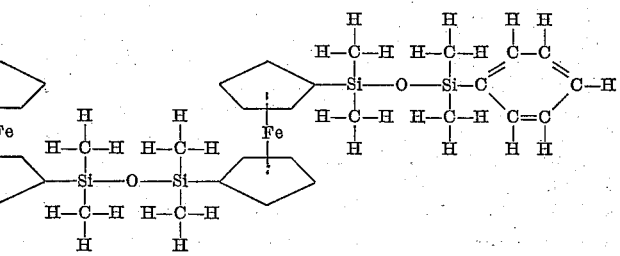

F. 1 - phenyldimethylsilyl - 1' - (3 - phenyl - 1,1,3,3-tetramethyldisiloxanyl)-ferrocene having the structure,

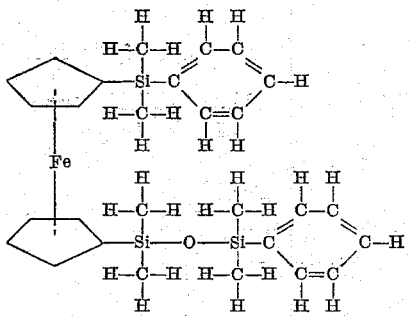

and

G. 1,5 - bis(1' - phenyldimethylsilyl - 1 - ferrocenyl)-1,1,3,3,5,5-hexamethyltrisiloxane having the structure,

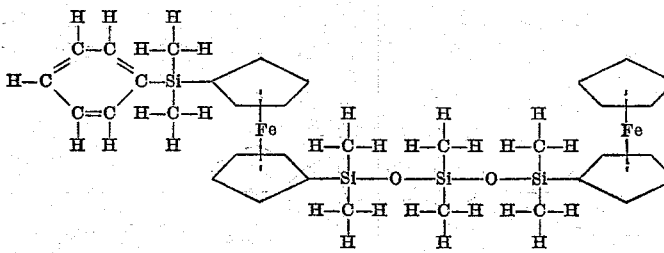

EXAMPLE 1

*Tris[(1'-phenyldimethylsilylferrocenyl)-dimethylsiloxy]-methylsilane*

A solution of n-butyllithium, obtained by the method of R. G. Jones and H. Gilman, "Organic Reactions," 6, 339 (1951), was prepared from 6.0 mols of n-butyl bromide and was added dropwise during a one-hour period to a stirred solution of 397 grams (6.0 mols) of cyclopentadiene in 3600 ml. of anhydrous ether under nitrogen in an ice bath. After the mixture was stirred an additional 1.5 hours without the ice bath, a mixture of 1460 ml. (12 mols) of dimethyldichlorosilane in 1500 ml. of ether was added in one portion and the mixture refluxed 17 hours. The volume of the mixture was then reduced by vacuum distillation, the mixture was filtered and washed with ether.

After removal of volatile material from the filtrate under vacuum, distillation of the residue through a 20-cm. Vigreux column gave a fraction, 657 grams, B.P. 37–40° C. at 7–4.5 mm. Hg pressure. The yield was 69%.

Analysis of the product showed that cyclopentadienyldimethylchlorsilane was produced having the empirical formula $C_7H_{11}ClSi$. Elemental analyses give the following results:

|  | Calculated | Found |
| --- | --- | --- |
| Carbon, percent | 52.97 | 53.08 |
| Hydrogen, percent | 6.99 | 6.87 |
| Chlorine, percent | 22.34 | 22.36 |
| Silicon, percent | 17.70 | 17.81 |

A solution of 63.4 grams (0.4 mol) of cyclopentadienyldimethylchlorosilane in 500 ml. of ether was stirred under nitrogen in an ice bath. Pyridine (31.6 grams; 0.4 mol) was added in one portion followed by the dropwise addition of 18.4 grams (0.4 mol) of ethanol during a 15-minute period. The mixture was stirred overnight, filtered, the solid washed with ether, and the filtrate evaporated in vacuo. The residue was distilled through a 20-cm. Vigreux column and the distillate, B.P. 36–50° C./2.6 mm., was again fractionated to give 50.0 grams (74%) of cyclopentadienyldimethylethoxysilane.

An isopropylmagnesium chloride solution was prepared by dropwise addition of 100 ml. of isopropyl chloride to 27 grams (1.1 mols) of magnesium in 250 ml. of ether after the reaction had been initiated by a mixture of 3 ml. of isopropyl bromide and 25 ml. of isopropyl chloride. A solution of 168 grams (1 mol) of cyclopentadienyldimethylethoxysilane in one liter of tetrahydrofuran was stirred under nitrogen in an ice bath until cold, and the isopropylmagnesium chloride solution was then added during a 15-minute period. After the mixture had stirred an additional hour in the ice bath, a ferrous chloride solution, prepared from 54.2 grams of ferric chloride and 9.40 grams of iron powder in 200 ml. of tetrahydrofuran, was added in four portions. The ice bath was removed and the mixture was stirred overnight. Solvent was removed by evaporation in vacuo and the residue was extracted with petroleum ether. Evaporation of the extract and subsequent distillation

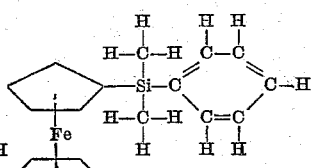

gave 121 grams (62%) of 1,1'-bis(dimethylethoxysilyl)-ferrocene, B.P. 131–132° C./0.4 mm., M.P. 14.5–17° C.

To a mixture of 118.4 grams (0.3 mol) of 1,1'-bis(dimethylethoxysilyl)-ferrocene, 250 ml. of dioxane, and 10 ml. (0.56 mol) of water was added 2.5 ml. of concentrated hydrochloric acid. Although the reaction appeared to be immediate as evidenced by a slight exothermic reaction, the solution was allowed to stand for 48 hours. Solvent was then removed by evaporation under vacuum. Extraction of the residue with a little methanol left 73.8 grams of 1,3-(1,1'-ferrocenylene)-tetramethyldisiloxane, M.P. 86–88° C. Evaporation of the extract and recrystallization of the residue from isopropyl alcohol furnished an additional 11.0 grams of the bridged compound, M.P. 86–87° C., for a total yield of 84.8 grams (90%), M.P. 86–88° C.

A solution of phenyllithium was prepared by the addition of 12.0 grams (0.077 mol) of bromobenzene in 30 ml. of ether to 1.0 gram of lithium slices in 50 ml. of ether during a one-hour period, with an additional one-hour reflux to assure complete reaction. The phenyllithium solution was added to 20 grams (0.063 mol) of 1,3-(1,1'-ferrocenylene)-tetramethyldisiloxane in 250 ml. of ether, and the mixture was refluxed overnight. To this mixture was added 3.0 grams (0.021 mol) of methyltrichlorosilane in 50 ml. of ether. The mixture was stirred overnight at room temperature, filtered and solvent removed from the filtrate in vacuo. The residue was extracted with petroleum ether and the extract evaporated. Distillation of the residue gave a fraction, B.P. 80–100° C./0.2 mm., from which 2.6 grams (13%) of 1,3-(1,1'-ferrocenylene)-tetramethyldisiloxane, M.P. 86–87° C., was recovered by recrystallization from methanol. A second fraction, B.P. 270–276° C./0.14 mm., was shown by analysis to be the crude product that was desired, tris-[(1' - phenyldimethylsilylferrocenyl)dimethylsiloxy] - methylsilane. It was again distilled, and the fraction B.P. 273–280° C./0.06 mm. was subjected to elemental analysis.

*Analysis.*—Calc'd for $C_{61}H_{78}Fe_3O_2Si_7$: C, 59.89; H, 6.43; Fe, 13.69. Found: C, 60.21, 60.27; H, 6.49, 6.40; Fe, 13.96.

EXAMPLE 2

1,1' - Bis[3 - (1' - Phenyldimethylsilylferrocenyl)-1,1,3,3-Tetramethyldisiloxanyl]-Ferrocene Cyclopentadienyldimethylchlorosilane, prepared as described in Example 1, (100 grams; 0.63 mol) in 700 ml. of ether was stirred under nitrogen in an ice bath while a solution of 107 grams (1.26 mols) of piperidine in 200 ml. of ether was added during a 15-minute period. After the mixture had stirred overnight at room temperature, the piperidine hydrochloride was removed by filtration and washed with petroleum ether. Solvent was removed from the filtrate and washings in vacuo under nitrogen, below room temperature. Distillation of the residue yielded cyclopentadienyldimethyl-(1-piperidyl)-silane, B.P. 61–64° C./0.45 mm.

Cyclopentadienyldimethyl - (1 - piperidyl)-silane (95 grams; 0.1457 mol) was converted to the corresponding ferrocene by the isopropylmagnesium chloride method described in Example 1 for the preparation of 1,1'-bis(dimethylethoxysilyl)-ferrocene. From the first distillation, 43 grams of crude starting material, B.P. 62–77° C./0.5 mm., was isolated. Redistillation of the lower fraction gave 37 grams (39%) of cyclopentadienyldimethyl-(1-piperidyl)-silane, B.P. 59–63° C./0.48 mm., $n_D^{25}$ 1.4962. 1,1'-bis[dimethyl-(1-piperidyl)-silyl]-ferrocene was obtained by redistillation of the higher fraction.

A solution of 10.9 grams (0.023 mol) of 1,1'-bis[dimethyl-(1-piperidyl)-silyl]-ferrocene in 450 ml. of anhydrous ether under nitrogen was stirred while hydrogen chloride was introduced into the solution for 30 minutes, five minutes beyond the point at which the exit gas was acid to moist litmus. A white precipitate gradually formed. The mixture was stirred for an additional 2.5 hours, then filtered under nitrogen; the collected solid was washed with petroleum ether. The filtrate was evaporated under a stream of nitrogen below 10° C., the residue was extracted with petroleum ether, and the extract was concentrated under nitrogen and refrigerated. The crystals which formed (6.4 grams) were collected and recrystallized from petroleum ether to give 5.3 grams (62%) of crude 1,1'-bis(dimethylchlorosilyl)-ferrocene, M.P. 43–49° C.

Finally, the desired product, 1,1'-bis[3-(1'-phenyldimethylsilylferrocenyl) - 1,1,3,3-tetramethyldisiloxanyl]-ferrocene, was obtained using the procedure described in Example 1 but where 11.7 grams (0.032 mol, ca.) of crude 1,1'-bis(dimethylchlorosilyl)-ferrocene was used in place of methyltrichlorosilane. From a fraction B.P. 90° C./0.28 mm. to 85° C./0.20 mm. was recovered 28% of the starting bridged ferrocene, M.P. 86–87.5° C. The distillation residue was dissolved in petroleum ether and absorbed on 500 grams of Woelm nonalkaline alumina, activity grade 1, in petroleum ether. Elution with 1500 ml. of petroleum ether:benzene (9:1) and 1600 ml. of petroleum ether:benzene (1:1) removed 16 grams of a reddish-brown oil. Distillation of this oil afforded 14.0 grams (41%) of the crude product desired, B.P. 296–306° C./0.09 mm.; found: Fe, 13.66, 13.31. It was redistilled, and the fraction (3.5 grams) of 1,1'-bis[3-(1'-phenyldimethylsilyl-ferrocenyl) - 1,1,3,3-tetramethyldisiloxanyl]-ferrocene, B.P. 310–320° C./0.08 mm. was subjected to elemental analysis.

Analysis.—Calc'd for $C_{54}H_{70}Fe_3O_2Si_6$: C, 59.66; H, 6.49; Fe, 15.41. Found: C, 5984, 59.99; H, 6.40, 6.43; Fe, 15.34.

EXAMPLE 3

1 - Trimethylsilyl - 1' - (3-Phenyl-1,1,3,3-Tetramethyldisiloxanyl)-ferrocene Methyllithium was prepared by the addition of 13.8 grams (0.095 mol) of methyl iodide in 30 ml. of ether during a 35-minute period to 1.6 grams of lithium slices in 100 ml. of ether cooled in an ice bath. The mixture was stirred one hour at room temperature and then refluxed for one hour. This solution was added to 20 grams (0.063 mol) of 1,3-(1,1'-ferrocenylene)-tetramethyldisiloxane, prepared as described in Example 1, in 250 ml. of ether and the mixture refluxed for four days. Phenyldimethylchlorosilane (10.7 grams; 0.063 mol) in 50 ml. of ether was then added and the mixture stirred at room temperature overnight and filtered. The filtrate was washed with water, the ether layer dried over sodium sulfate, and ether removed in vacuo. Distillation of the residue gave 15.3 grams (52%) of the desired product, 1 - trimethylsilyl-1'-(3-phenyl-1,1,3,3-tetramethyldisiloxanyl)-ferrocene. The product was subjected to elemental analysis.

Analysis.—Calc'd for $C_{23}H_{34}FeOSi_3$: Fe, 11.97; C, 59.20; H, 7.34. Found: Fe, 12.41, 12.18, 11.99; C, 59.15, 59.14; H, 7.42, 7.40.

EXAMPLE 4

1,5 - Bis(1' - Trimethylsilylferrocenyl) - 1,1,3,3,5,5-Hexamethyltrisiloxane The procedure in Example 3 for the cleavage of 1,3-(1,1'-ferrocenylene)-tetramethyldisiloxane in ether with methyllithium was repeated, except that the resulting solution was refluxed three days instead of four. The mixture was then treated with 4.1 grams (0.0318 mol) of dimethyldichlorosilane in 40 ml. of ether, added in one portion. After the mixture had stirred overnight, it was filtered, the filtrate washed with water and then dried and evaporated in vacuo. Distillation of the residue furnished two main fractions: 10.0 grams, B.P. 90–115° C./0.14 mm., and 8.5 grams, B.P. 210–218° C./0.09 mm. The second fraction was desired product, 1,5-bis(1'-trimethylsilylferrocenyl) - 1,1,3,3,5,5-hexamethyltrisiloxane. The product was subjected to elemental analysis.

Analysis.—Calc'd for $C_{32}H_{52}Fe_2O_2Si_5$: C, 53.31; H, 7.27; Fe, 15.49. Found: C, 53.78, 53.57; H, 7.31, 7.24; Fe, 15.94.

EXAMPLE 5

1,3 - Bis[1' - (3 - Phenyltetramethyldisiloxanyl)-Ferrocenyl]-Tetramethyldisiloxane A solution of n-butyllithium, prepared by the method of Jones and Gilman referred to in Example 1, from 0.056 mol of n-butyl bromide, was added during a 10-minute period to 4.25 grams (0.05 mol) of piperidine in 50 ml. of ether. After the solution was stirred for 1.5 hours, 15.8 grams (0.05 mol) of 1,3-(1,1'-ferrocenylene)-tetramethyldisiloxane was added and the mixture stirred 20 hours. Phenyldimethylchlorosilane (8.6 grams; 0.05 mol) in 10 ml. of ether was then introduced and stirring continued for four hours. The reaction mixture was evaporated to dryness in vacuo, the residue was extracted with petroleum ether, and the extract distilled. From a fraction, B.P. 90–100° C./0.4 mm., 4.8 grams (30%) of the starting bridged ferrocene, M.P. 86–87.5° C., was recovered by recrystallization from isopropyl alcohol. A high boiling fraction, 12.7 grams (47%), B.P. 204–210° C./0.35 mm., $n_D^{25}$ 1.5509, was 1-dimethyl-(1-piperidyl)-silyl-1'-(3-phenyltetramethyldisiloxanyl)-ferrocene. This intermediate product was subjected to elemental analysis.

Analysis.—Calc'd for $C_{27}H_{41}FeNOSi_3$: C, 60.54; H, 7.71; Fe, 10.43; N, 2.62. Found: C, 60.67, 60.80; H, 7.85, 7.82; Fe, 10.55, 10.38; N, 2.23, 2.21.

To 8.69 grams (0.0162 mol) of 1-dimethyl-(1-piperidyl) - silyl - 1' - (3 - phenyltetramethyldisiloxanyl) - ferrocene in 8 ml. of dioxane was added 0.146 gram (0.0081 mol) of water in 0.85 gram of dioxane. The mixture was allowed to stand one hour and then refluxed for one hour. Removal of solvent by evaporation in vacuo and distillation of the residue gave 6.0 grams (81%) of the desired disiloxane, B.P. 290–300° C./0.3 mm. This procedure was then repeated with doubled quantities, and the product, 12.1 grams (82%), B.P. 283–298° C./0.09 mm., combined with the first lot and redistilled for analysis; B.P. 283–290° C./0.025 mm., $n_D^{25}$ 1.5572. The final product, 1,3-bis[1'-(3-phenyltetramethyldisiloxanyl)-ferrocenyl]-tetramethyldisiloxane, was subjected to elemental analysis.

*Analysis.*—Calc'd for $C_{44}H_{62}Fe_2O_2Si_6$: C, 57.49; H, 6.80; Fe, 12.15. Found: C, 57.43, 57.31; H, 6.95, 6.85; Fe, 12.07.

EXAMPLE 6

*1-Phenyldimethylsilyl-1'-(3-Phenyl-1,1,3,3-Tetramethyldisiloxanyl)-Ferrocene*

Phenyllithium was prepared by the addition of 9.9 grams (0.063 mol) of bromobenzene in 20 ml. of ether to 1.0 gram of lithium slices in 50 ml. of ether during a one-hour period, with an additional one-hour reflux to assure complete reaction. The phenyllithium solution was added to 20 grams (0.063 mol) of 1,3-(1,1'-ferrocenylene)-tetramethyldisiloxane in 250 ml. of ether, and the mixture was refluxed overnight to produce lithium (1'-phenyldimethylsilyl-1-ferrocenyl)dimethylsiloxide.

To the ether solution of lithium (1'-phenyldimethylsilyl-1-ferrocenyl)dimethylsiloxide was added 10.7 grams (0.063 mol) of phenyldimethylchlorosilane in 50 ml. of ether. The mixture was stirred overnight, filtered, and solvent removed from the filtrate in vacuo. Distillation of the residue yielded two fractions, 5.5 grams, B.P. 76–91° C./0.1 mm., and 26 grams, B.P. 207–230° C./0.05 mm.

By crystallization of the first fraction from isopropyl alcohol, 2.3 grams (11.5%) of 1,3-(1,1'-ferrocenylene)-tetramethyldisiloxane, M.P. 82–84° C., was recovered. The second fraction upon redistillation yielded 21.5 grams (65%) of 1 - (phenyldimethylsilyl) - 1' - (3-phenyltetramethyldisiloxanyl)-ferrocene, B.P. 200–208° C./0.03 mm., $n_D^{25}$ 1.5740; the infrared spectrum showed bands in the siloxane region at 1065–1030 cm.$^{-1}$.

*Analysis.*—Calc'd for $C_{28}H_{36}FeOSi_3$: C, 63.61; H, 6.86; Fe, 10.56. Found: C, 63.74, 63.81; H, 6.86, 6.91; Fe, 10.77.

EXAMPLE 7

*1,5-Bis(1'-Phenyldimethylsilyl-1-Ferrocenyl)-1,1,3,3,5,5-Hexamethyltrisiloxane*

Lithium (1' - phenyldimethylsilyl - 1 - ferrocenyl)dimethylsiloxide was prepared in ether solution as described in Example 6, except that a 1.1:1 ratio of bromobenzene to the bridged compound was used. To the solution was added 4.1 grams (0.0318 mol) of dimethyldichlorosilane in 20 ml. of ether, and the mixture was stirred overnight. After filtration, solvent was removed under vacuum; the residue was extracted with petroleum ether, and the extract was distilled. From a fraction B.P. 73–160° C./0.08 mm., 1.55 grams (8%) of 1,3-(1,1-ferrocenylene)-tetramethyldisiloxane, M.P. 80–82° C., was recovered by crystallization from isopropyl alcohol. The largest fraction, 19.5 grams, B.P. 284–319° C./0.08 mm., was redistilled to give 14.5 grams (55%) of 1,5-bis(1'-phenyldimethylsilyl-1-ferrocenyl)-hexamethyltrisiloxane, B.P. 283–285° C./0.03 mm., $n_D^{25}$ 1.5791.

*Analysis.*—Calc'd for $C_{42}H_{56}Fe_2O_2Si_5$: C, 59.55; H, 6.90; Fe, 13.22. Found: C, 59.96; H, 7.15; Fe, 13.39, 13.34.

The unusually desirable properties of the compositions of the invention as functional fluids under conditions of high temperature were shown by determining the weight loss of samples held at 366° C. (690.8° F.) for 10 hours under pure nitrogen. Changes in viscosity due to this treatment were also noted. To illustrate the wide liquid range of the compositions of the invention, the pour point was determined and an effort was made to determine the boiling point at atmospheric pressure.

The atmospheric pressure boiling point is, of course, higher than about 700° F. as shown by the thermal stability test described above. Actually, the compositions of the invention remain in liquid form up to about 750° F. or higher. In general, no clearly defined boiling points at atmospheric pressure were determined because the compounds of the invention begin to decompose slowly at about 850° F. and higher.

All of these properties are summarized below in Table 1.

TABLE 1

*Thermal Stability of Unsymmetrically-Substituted Siloxanylferrocenes*

| Ex. No. | Compound | Weight Loss, percent | Boiling Point,[a] ° F. | Pour Point, ° F. | Viscosity, cs., at 100° F. | |
|---|---|---|---|---|---|---|
| | | | | | Before | After |
| 1 | Tris[(1'-phenyldimethylsilylferrocenyl)dimethylsiloxy]-methylsilane | 0.60 | 851 | [b] 14 | 473 | 805 |
| 2 | 1,1'-Bis[3-(1'-phenyldimethylsilylferrocenyl)1,1,3,3-tetramethyldisiloxanyl]-ferrocene | 0.14 | [c] 842 | 32 | 1,110 | 1,530 |
| 3 | 1-Trimethylsilyl-1'-(3-phenyl-1,1,3,3-tetramethyldisiloxanyl)-ferrocene | 0.96 | 766 | −29 | 14.5 | 17.8 |
| 4 | 1,5-Bis(1'-trimethylsilylferrocenyl)-1,1,3,3,5,5-hexamethyltrisiloxane | 1.1 | 801 | −8 | 62.8 | 77.8 |
| 5 | 1,3-Bis[1'-(3-phenyltetramethyldisiloxanyl)ferrocenyl]-tetramethyldisiloxane | 0.16 | [c] 842 | −4 | 89.5 | 106 |
| 6 | 1-Phenyldimethylsilyl-1'-(3-phenyl-1,1,3,3-tetramethyldisiloxanyl)-ferrocene | 0.5 | 860 | 9 | 32.4 | 46.3 |
| 7 | 1,5-Bis(1'-phenyldimethylsilyl-1-ferrocenyl)-1,1,3,3,5,5-hexamethyltrisiloxane | 0.2 | 851 | 1 | 185 | 300 |

[a] Approximate.
[b] Estimated.
[c] Decomposes slowly.

In addition to the desirable properties of wide liquid range and exceptional thermal stability, the compositions of the invention have favorable electrical properties. These are summarized below for the products of Examples 6 and 7.

TABLE 2

| Ex. No. | Temp., ° C. | Frequency, c.p.s.[1] | Dielectric Constant | Dissipation Factor | Conductivity, mho/c. |
|---|---|---|---|---|---|
| 6 | 25 | $10^2$ | 2.77 | $1.30 \times 10^{-3}$ | $2.00 \times 10^{-13}$ |
| 6 | 25 | $2 \times 10^2$ | 2.77 | $6.65 \times 10^{-4}$ | $2.05 \times 10^{-13}$ |
| 6 | 25 | $10^3$ | 2.77 | $1.45 \times 10^{-4}$ | $2.20 \times 10^{-13}$ |
| 6 | 60 | $10^2$ | 2.70 | $7.65 \times 10^{-3}$ | $1.15 \times 10^{-12}$ |
| 6 | 60 | $2 \times 10^2$ | 2.70 | $3.85 \times 10^{-3}$ | $1.15 \times 10^{-12}$ |
| 6 | 60 | $10^3$ | 2.70 | $7.90 \times 10^{-4}$ | $1.20 \times 10^{-12}$ |
| 7 | 25 | $10^2$ | 2.84 | $1.50 \times 10^{-3}$ | $2.40 \times 10^{-13}$ |
| 7 | 25 | $2 \times 10^2$ | 2.84 | $8.20 \times 10^{-4}$ | $2.60 \times 10^{-13}$ |
| 7 | 25 | $10^3$ | 2.84 | $1.88 \times 10^{-4}$ | $2.95 \times 10^{-13}$ |
| 7 | 60 | $10^2$ | 2.76 | $1.38 \times 10^{-2}$ | $2.10 \times 10^{-12}$ |
| 7 | 60 | $2 \times 10^2$ | 2.76 | $6.65 \times 10^{-3}$ | $2.05 \times 10^{-12}$ |
| 7 | 60 | $10^3$ | 2.76 | $1.43 \times 10^{-3}$ | $2.20 \times 10^{-12}$ |

[1] C.p.s. is cycles per second.

I claim:

1. As a new composition of matter, an unsymmetrically-substituted siloxanylferrocene selected from the group consisting of tris[(1'-phenyldimethylsilylferrocenyl)dimethylsiloxy]-methylsilane, 1,1'-bis[3-(1'-phenyldimethylsilylferrocenyl)-1,1,3,3-tetramethyldisiloxanyl]-ferrocene,
1-trimethylsilyl-1'-(3-phenyl-1,1,3,3-tetramethyldisiloxanyl)-ferrocene,
1,5-bis(1'-trimethylsilylferrocenyl)-1,1,3,3,5,5-hexamethyltrisiloxane,
1,3-bis[1'-(3-phenyltetramethyldisiloxanyl)-ferrocenyl]-tetramethyldisiloxane,
1-phenyldimethylsilyl-1'-(3-phenyl-1,1,3,3-tetramethyldisiloxanyl)-ferrocene and
1,5-bis(1'-phenyldimethylsilyl-1-ferrocenyl)-1,1,3,3,5,5-hexamethyltrisiloxane.

2. Tris[(1'-phenyldimethylsilylferrocenyl)dimethylsiloxy]-methylsilane.

3. 1,1'-bis[3-(1'-phenyldimethylsilylferrocenyl)-1,1,3,3-tetramethyldisiloxanyl]-ferrocene.

4. 1-trimethylsilyl-1'-(3-phenyl-1,1,3,3-tetramethyldisiloxanyl)-ferrocene.

5. 1,5-bis(1'-trimethylsilylferrocenyl)-1,1,3,3,5,5-hexamethyltrisiloxane.

6. 1,3-bis[1'-(3-phenyltetramethyldisiloxanyl)-ferrocenyl]-tetramethyldisiloxane.

7. 1-phenyldimethylsilyl-1'-(3-phenyl-1,1,3,3-tetramethyldisiloxanyl)-ferrocene.

8. 1,5-bis(1'-phenyldimethylsilyl-1-ferrocenyl)-1,1,3,3,5,5-hexamethyltrisiloxane.

References Cited in the file of this patent

UNITED STATES PATENTS 2,831,880    Benkeser _____ Apr. 22, 1958